United States Patent
Spies et al.

(10) Patent No.: US 8,949,625 B2
(45) Date of Patent: Feb. 3, 2015

(54) SYSTEMS FOR STRUCTURED ENCRYPTION USING EMBEDDED INFORMATION IN DATA STRINGS

(75) Inventors: Terence Spies, Mountain View, CA (US); Philip Hillyer Smith, III, Herndon, VA (US)

(73) Assignee: Voltage Security, Inc., Cupertino, CA (US)

( * ) Notice: Subject to any disclaimer, the term of this patent is extended or adjusted under 35 U.S.C. 154(b) by 345 days.

(21) Appl. No.: 13/361,920

(22) Filed: Jan. 30, 2012

(65) Prior Publication Data

US 2013/0198525 A1    Aug. 1, 2013

(51) Int. Cl.
*G06F 12/14*    (2006.01)

(52) U.S. Cl.
USPC ............... 713/193; 380/28; 380/43; 380/278; 705/79

(58) Field of Classification Search
CPC ... G06F 7/22; G06F 21/6227; G06F 21/6245; G06F 21/64; H04L 9/008; H04L 9/0618; G06Q 20/3829; G06Q 20/4012; G06Q 20/027; G11B 20/021
USPC .................. 380/28, 43, 278; 713/193; 705/79
See application file for complete search history.

(56) References Cited

U.S. PATENT DOCUMENTS

| | | | |
|---|---|---|---|
| 5,499,293 A | 3/1996 | Behram et al. | |
| 6,836,765 B1 | 12/2004 | Sussman | |
| 6,885,748 B1 | 4/2005 | Wang | |
| 7,418,098 B1 | 8/2008 | Mattsson | |
| 7,567,934 B2 | 7/2009 | Flitcroft et al. | |
| 7,665,015 B2 * | 2/2010 | Dignum et al. | 715/234 |
| 7,738,717 B1 | 6/2010 | Palmer et al. | |

(Continued)

FOREIGN PATENT DOCUMENTS

| | | |
|---|---|---|
| EP | 1209550 | 5/2002 |
| EP | 1906336 | 4/2008 |

(Continued)

OTHER PUBLICATIONS

Thomas Stutz and Andreas Uhl, "On Format-Compliant Iterative Encryption of JPEG2000", Proceedings of the Eigth IEEE International Symposium on Multimedia (ISM '06), 2006.

(Continued)

*Primary Examiner* — Eleni Shiferaw
*Assistant Examiner* — Paul Callahan
(74) *Attorney, Agent, or Firm* — Treyz Law Group; Louis R. Levenson; Michael H. Lyons

(57) ABSTRACT

A data processing system is provided that includes applications, databases, encryption engines, and decryption engines. Encryption and decryption engines may be used to perform format-preserving encryption on data strings stored in a database. Encryption and decryption engines may include embedded-format-preserving encryption and decryption engines. Embedded-format-preserving encryption engines may be used to encrypt data strings and embed information in data strings. Information corresponding to a format-preserving encryption operation of a data string may be embedded in an associated data string. The associated data string may be encrypted before or after embedding the information in the associated data string. The embedded information may include key management data that corresponds to a managed encryption key that was used to encrypt the data string.

23 Claims, 19 Drawing Sheets

(56) References Cited

U.S. PATENT DOCUMENTS

| | | |
|---|---|---|
| 7,864,952 B2 | 1/2011 | Pauker et al. |
| 8,208,627 B2 | 6/2012 | Pauker et al. |
| 8,355,982 B2 | 1/2013 | Hazel et al. |
| 2003/0028481 A1 | 2/2003 | Flitcroft et al. |
| 2003/0191719 A1 | 10/2003 | Ginter et al. |
| 2005/0132070 A1 | 6/2005 | Redlich et al. |
| 2008/0170693 A1* | 7/2008 | Spies et al. ............ 380/277 |
| 2009/0060199 A1 | 3/2009 | von Mueller et al. |
| 2009/0070583 A1 | 3/2009 | von Mueller et al. |
| 2009/0310778 A1 | 12/2009 | von Mueller et al. |
| 2010/0246813 A1 | 9/2010 | Morris et al. |
| 2011/0103579 A1 | 5/2011 | Martin et al. |
| 2011/0211689 A1* | 9/2011 | von Mueller et al. ......... 380/28 |
| 2013/0254117 A1* | 9/2013 | von Mueller et al. ......... 705/71 |

FOREIGN PATENT DOCUMENTS

| | | |
|---|---|---|
| EP | 1909212 | 9/2008 |
| WO | 2006107777 | 10/2006 |

OTHER PUBLICATIONS

J. Black and P. Rogaway, "Ciphers with Arbitrary Finite Domains", [online], Feb. 12, 2001, <URL: eprint.iacr.org/2001/012.ps>.

Brightwell et al., "Using Datatype-Preserving Encryption to Enhance Data Warehouse Security", 20th National Information Systems Security Conference, Oct. 7-10, 1997—Baltimore, Maryland.

Black et al., "Ciphers with Arbitrary Finite Domains", RSA Conference 2002, San Jose, CA, USA, Feb. 18-22, 2002, Proceedings, "Lecture Notes in Computer Science", 2271 Springer 2002, ISBN 3-540-43224-8, (p. 114-130).

* cited by examiner

SYSTEMS FOR STRUCTURED ENCRYPTION USING EMBEDDED INFORMATION IN DATA STRINGS

BACKGROUND OF THE INVENTION

This invention relates to cryptography and, more particularly, to preserving data formats during encryption and decryption of data using embedding of information in data strings.

Cryptographic systems are used to secure data in a variety of contexts. For example, encryption algorithms are used to encrypt sensitive information such as financial account numbers, Social Security Numbers, and other personal information. Sensitive data is sometimes encrypted prior to storage in a database.

The Payment Card Industry Data Security Standard (PCI DSS) and other data security regulations often require a cryptographic system to support key rollover in which encryption keys are periodically changed and a key version number is required to obtain the appropriate encryption key when decrypting encrypted data. Key rollover support therefore requires additional information (e.g., key version numbers) to be stored in a database.

In order to overcome difficulties with adding additional data fields to an existing database, conventional cryptographic systems sometimes embed extra information within the data itself. This can be accomplished by mapping the data to an expanded character space prior to encryption in order to create extra space in which the extra information is stored.

However, some database columns and applications can be inflexible about data format. For example, a US Social Security Number is often required be 9 decimal digits, and may even be stored in binary formats (such as Packed Decimal) that cannot support non-decimal digits and therefore cannot be mapped to an expanded character space.

Encryption techniques that encrypt and decrypt data without altering the format of the data are sometimes used to encrypt sensitive data while preserving the format of the sensitive data. However, it may be difficult to store additional information such as key version numbers while maintaining compatibility with inflexible data format restrictions.

It would therefore be desirable to provide improved methods for supporting encryption key rollover during format-preserving encryption and decryption of data.

SUMMARY OF THE INVENTION

In accordance with the present invention, a data processing system is provided that includes applications and databases. The applications and databases handle data. The data includes data strings containing characters.

Each data string may have an associated data string type that specifies a legal set of characters for the data string. Some data strings may have a data format that specifies the same legal set of characters. For example, a data string storing a United States Social Security Number (SSN) must be nine decimal digits. Systems that store and process SSNs may be unable to handle data strings having non-decimal digits.

Additional associated data strings also have a data format that specifies a subset of the legal set of characters. For example, an associated data string storing a number may use a data format that uses a character set of numerical characters. Such a data string may actually have a data type that allows letters and special characters in addition to numerical characters. The unused characters (letters and special characters in this example) may be used for embedding information in the associated data string.

Information may be embedded in an associated data string by recoding some or all of the associated data string from its original data format to a new data format that uses a larger set of legal characters. The larger set of characters enables the associated data string to store embedded information without irreversibly obscuring the original associated data string contents.

Embedding information in associated data strings may be particularly useful when format-preserving encryption is used to encrypt data strings. Format-preserving encryption and decryption engines are provided that may be used to encrypt individual data strings without altering their original data formats. For example, format-preserving encryption may be used to encrypt a SSN into an encrypted ciphertext having the same format of nine numerical characters. Format-preserving encryption may be performed using a managed encryption key (e.g., an encryption key corresponding to key management data such as a given key version number).

After format-preserving encryption of the data string with the managed encryption key, information corresponding to the key management data can be embedded in an associated data string. The associated data string containing the embedded information may also, if desired, be encrypted using format-preserving or other encryption techniques. This allows an encryption engine to store encryption-related information in a database without having to add data fields or make modifications to the database.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
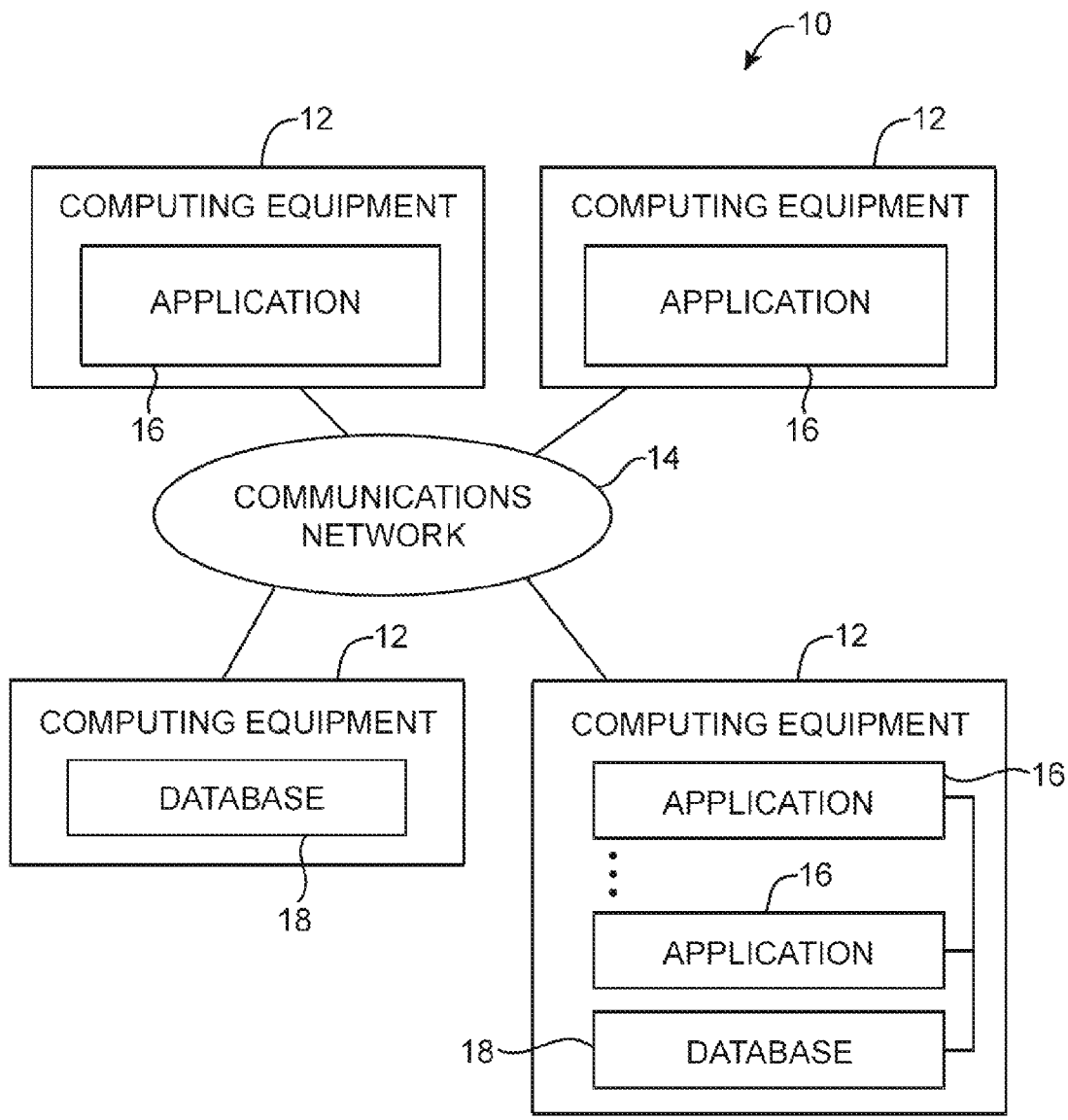
FIG. 1 is a diagram of an illustrative system environment containing databases and applications in accordance with an embodiment of the present invention.

An illustrative computing system 10 that may be used to implement data processing functions in accordance with the present invention is shown in FIG. 1. System 10 includes computing equipment 12 and communications network 14. The computing equipment 12 may include one or more personal computers, workstations, computers configured as servers, mainframe computers, portable computers, etc. Computing equipment 12 may include processing circuitry, displays, input-output devices, and storage (e.g., hard drives, volatile memory, non-volatile memory, and other storage media) that can run code for system 10. The communications network 14 may be a local area network or a wide area network such as the internet. System 10 may be used in processing data for one or more organizations.

Computing equipment 12 may be used to support applications 16 and databases 18. In computing equipment 12 in which multiple applications run on the same computer platform, applications and databases may communicate with each other directly. If desired, applications 16 can communicate with each other and with databases 18 remotely using communications network 14. For example, an application 16 that is run on a computer in one country may access a data file stored on a database 18 that is located in another country or an application 16 running on one computer may use network 14 to transmit data to an application 16 that is running on another computer. Applications 16 may be any suitable applications, such as financial services applications, governmental record management applications, etc.

The data that is handled by system 10 may include sensitive items such as individuals' addresses, Social Security Numbers and other identification numbers, license plate numbers, passport numbers, financial account numbers such as credit card and bank account numbers, telephone numbers, email addresses, etc.

To prevent unauthorized access to sensitive data and to comply with data privacy regulations and other restrictions, sensitive data may need to be encrypted. Encryption operations may be performed before data is passed between applications 16 or before data is stored in a database 18. Because various applications may need to access different types of data, the system 10 preferably allows data to be selectively encrypted. As an example, each of the telephone numbers and each of the credit card numbers can be individually encrypted using separate cryptographic keys. With this type of selective encryption arrangement, an application that requires access to telephone numbers need not be provided with access to credit card numbers and vice versa.

To support encryption and decryption operations in system 10, applications 16 may be provided with encryption and decryption engines. For example, an application 16 that accesses a database 18 over a communications network 14 may have an encryption engine for encrypting sensitive data before it is provided to the database 18 and stored and may have a decryption engine for use in decrypting encrypted data that has been retrieved from database 18 over communications network 14. As another example, a first application may have an encryption engine for encrypting sensitive data before passing the encrypted data to a second application. The second application may have a decryption engine for decrypting the encrypted data that has been received from the first application.

Encryption engines may include format-preserving encryption (FPE) engines that perform encryption that preserves the format of a plaintext string and may include embedded-format-preserving encryption (EFPE) engines that embed information in data strings and perform FPE encryption of data strings. Embedded information in one data string may include information associated with an FPE operation on an associated plaintext string.

Encryption engines (e.g., FPE engines and EFPE engines) may have associated key generators for generating shared encryption keys, counters for generating time stamps or counts corresponding to key version numbers, key derivation engines that generate count-specific encryption keys using counts and shared keys, or other associated components. An EFPE engine may include an FPE engine, an embedding engine for embedding data in an FPE encrypted ciphertext, a compression engine for compressing plaintext strings, an appending engine for appending information to a compressed string, or other components.

Any suitable technique may be used to provide applications 16 with encryption and decryption capabilities. For example, the encryption and decryption engines may be incorporated into the software code of the applications 16, may be provided as stand-alone applications that are invoked from within a calling application, or may be implemented using a distributed arrangement in which engine components are distributed across multiple applications and/or locations.

The data handled by the applications 16 and databases 18 of system 10 is represented digitally. The data includes strings of characters (i.e., names, addresses, account numbers, etc.). Strings of characters for associated data (e.g., a name, an address, and one or more sensitive numbers associated with a given person) may be stored in associated fields of a common portion of a data file. A portion of a data file may be a row of a table, a column of a table, an element of an encoded file (e.g., an Extensible Markup Language (XML) document), an object in a scripted document (e.g., a JavaScript Object Notation (JSON) document), or other portion of a data file for storing associated data entries. Consider, as an example, a scenario in which a credit card company maintains a database of credit card data for its customers.

Figure 2A:
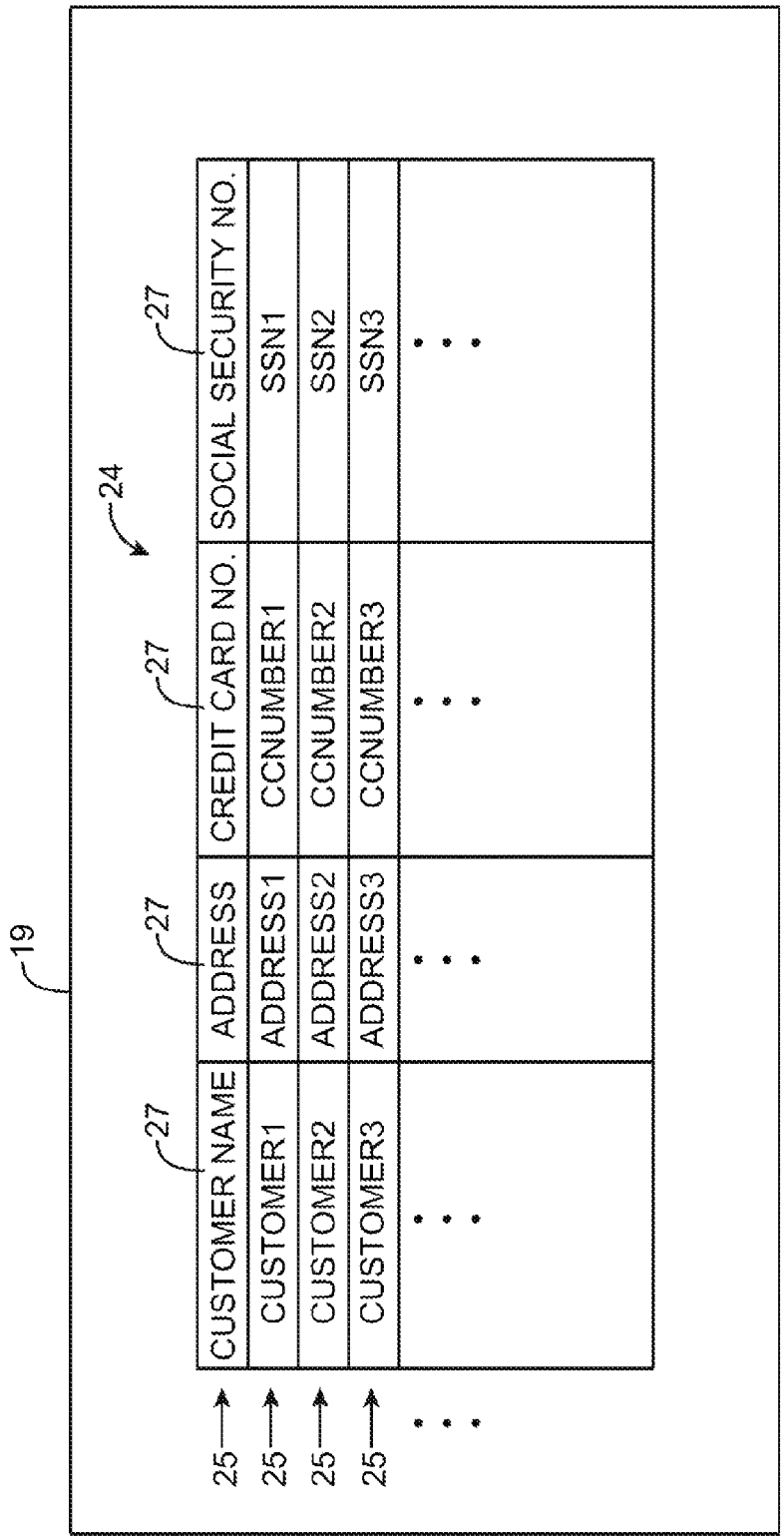
FIG. 2A is a diagram of illustrative information that may be stored in a database showing data entries in a database table that may be individually encrypted and augmented with embedded information in accordance with an embodiment of the present invention.

An illustrative data file 19 including a database table 24 that might be associated with this type of database is shown in FIG. 2A. As shown in FIG. 2A, table 24 has four columns of data entries. The first column is used to store customer names. The second column of table 24 is used to store corresponding customer addresses. The third column and fourth column are used to store credit card numbers and social security card numbers, respectively. Each row 25 of table 24 corresponds to a different customer. An application that desires to retrieve a data entry such as the Social Security Number of the fourth customer in table (as an example), retrieves the Social Security Number from the Social Security Number field 27 that is associated with the fourth row 25 of table 24. However, this is merely illustrative. Fields of a data file for storing data entries may be arranged in any type of common portions of the data file.

Figure 2B:
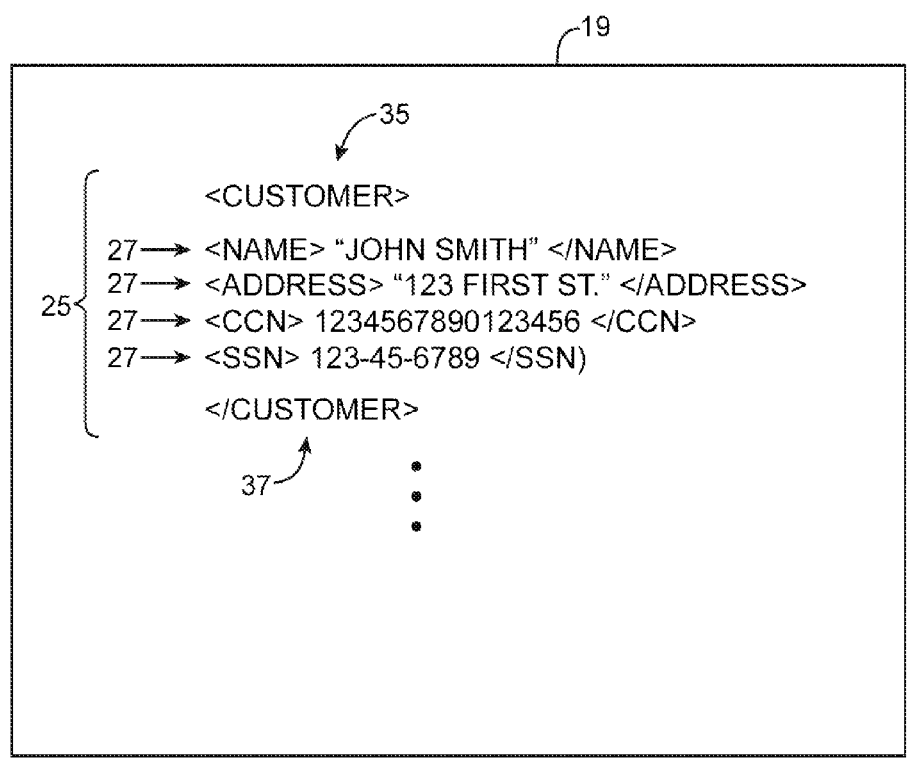
FIG. 2B is a diagram of illustrative information that may be stored in a database showing data entries in elements of an encoded document that may be individually encrypted and augmented with embedded information in accordance with an embodiment of the present invention.

As shown in FIG. 2B, fields 27 may be sub-elements of logical elements 25 in an encoded document such as an XML-style document. Each element of an encoded document may be delimited by start and end indicators such as indicators 35 and 37 respectively. In the example of FIG. 2B, associated data entries for a customer "John Smith" are stored as data strings (e.g., John Smith and 123-45-6789) in sub-elements 27 of a common logical element 25 that is delimited by indicators 35 and 37.

Figure 2C:
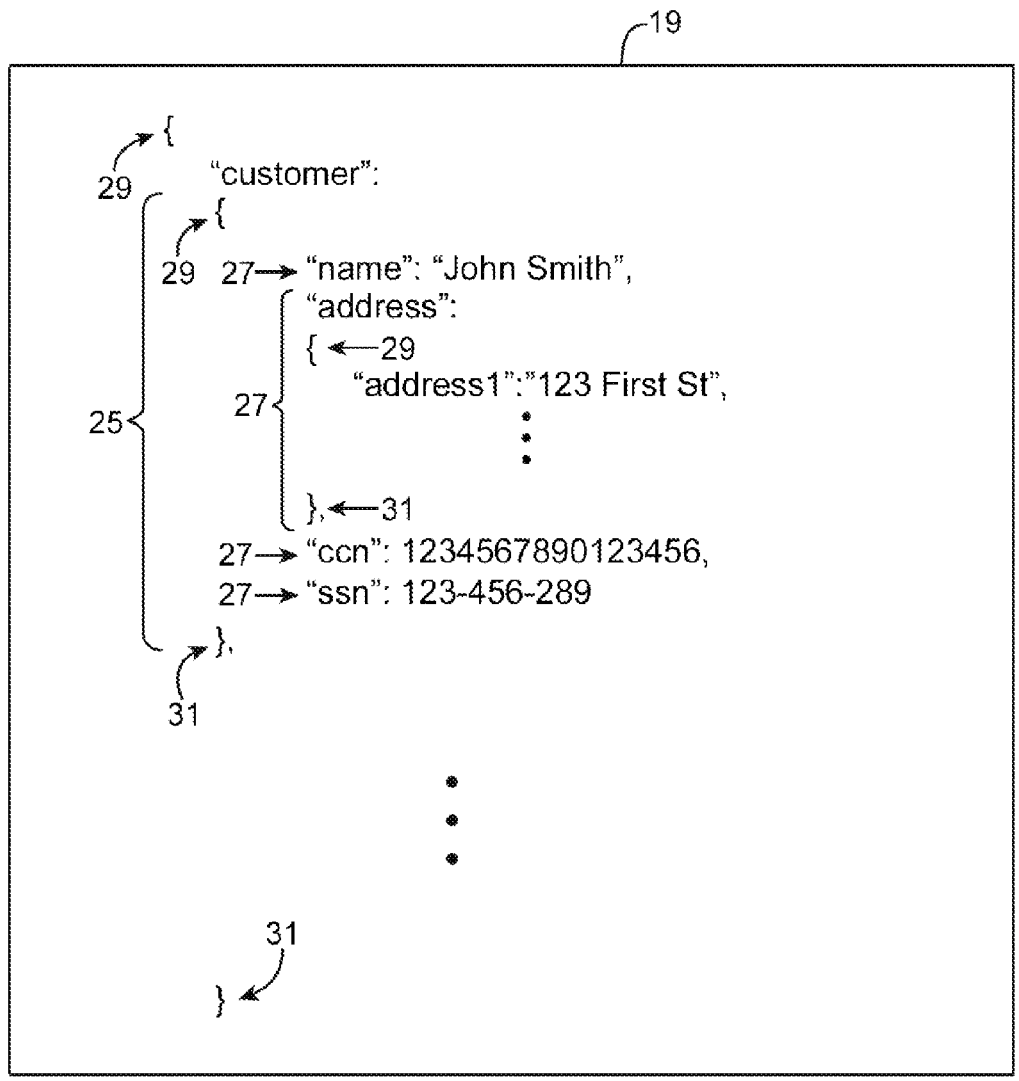
FIG. 2C is a diagram of illustrative information that may be stored in a database showing data entries in object fields of a scripted document that may be individually encrypted and augmented with embedded information in accordance with an embodiment of the present invention.

As shown in FIG. 2C, fields 27 may be portions of objects 25 in a scripted document such as a JSON-style document. Each object in a scripted document may be delimited by start and end indicators such as left and right curly brackets 29 and 31 respectively. In the example of FIG. 2C, associated data entries for a customer "John Smith" are stored as data strings in key-value pairs 27 of a common object 25 that is delimited by indicators 35 and 37. As shown in FIG. 2C, a field 27 such as the "address" field may include a sub-object having multiple data entries, if desired.

The examples of FIGS. 2A, 2B, and 2C are merely illustrative. Associated data entries in databases 18 may be stored in any type of associated fields of a common portion of data file.

The data strings that are handled in a typical data processing system have defined formats. For example, an identification number may be made up of a letter followed by two digits. The customer name field may contain 20 characters. Valid characters for a data entry in the customer name field may be restricted to uppercase and lowercase letters and certain punctuation characters. The address field may contain 100 characters. Valid address field characters may be restricted to uppercase and lowercase letters, numbers, and certain punctuation characters. The Social Security Number fields may be populated by strings of nine digits. The digits may be restricted to certain ranges and be separated by dashes.

Some of the fields 27 of data file 19 and the applications that interact with data file 19 may require data strings (data entries) of a particular format. Because databases and applications may require data strings of a particular format, care must be taken not to alter the format of a string during encryption and decryption operations. For example, because only digits (and spaces) are used in credit card field, a credit card string that contains a letter would be invalid. If an encryption operation is performed on a credit card number that causes the encrypted version of the credit card number to contain letters, the required credit card number format will not be preserved.

An encryption engine may be therefore be configured to implement a format-preserving-encryption (FPE) process. An example of a cryptographic algorithm that may be used to implement an FPE process is the FFX mode of AES (Advanced Encryption Standard). This is merely illustrative. Any suitable FPE or structure-preserving-encryption (SPE) algorithms may be used in encrypting and decrypting sensitive information if desired. The use of an FPE encryption algorithm may allow the format of the encrypted data to be preserved (versus traditional encryption approaches, which render the encrypted data into a binary field). For example, the FPE algorithm may be used to encrypt a sensitive plaintext string such as one of the data entries in one of the fields 27 of data file 19 including N alphanumeric characters into N different alphanumeric characters, thereby preserving the format of the data entry.

Encryption standards such as the Payment Card Industry Data Security Standard (PCI DSS) and other data security regulations require support for key rollover in which encryption keys are periodically changed and a key version number is required to obtain the appropriate encryption key when decrypting encrypted data. Key rollover support may therefore be provided by storing additional information (e.g., key version numbers) in a database.

However, it may be difficult to add additional data fields to an existing database without imposing system-wide changes to storage and processing of data in the database. It may therefore be desirable to store additional encryption information such as a key version number within existing fields of a database. Because some fields (e.g., Social Security Numbers, credit card numbers, etc.) have a format that cannot be altered, encryption information (e.g., a key version number) relating to FPE encryption of a field may be embedded within another associated data field (e.g., an address or a name) that has a less restrictive format specification. Unencrypted data strings are sometimes referred to as plaintext. Following encryption, encrypted data strings are sometimes referred to as ciphertext.

In some cases, a data format for a data string may use a character set that is a subset of a character set allowed for the data string. For example, a data string might be a person's name having only alphabetical characters (letters), while numerical characters, letters, and special characters may be allowed for that data string. For example, a database that is programmed in SQL (structured query language) may have data strings of type VARCHAR. Data strings of type VARCHAR can have characters that are letters, numbers, or special characters. Alphabetical characters are therefore a subset of the allowed VARCHAR characters. When a data string of type VARCHAR is used to store alphabetical (or numerical) characters such as names, only a subset of characters allowed by type VARCHAR will generally be needed to store the unmodified name data.

If a data string uses a character set (e.g., numerical characters) that is a subset of characters allowed by the data type (e.g., when using alphabetical or numerical characters that are a subset of the character set made up of numerical characters, letters and special characters), then the larger set of characters (e.g., numerical characters, letters, and special characters) may be used to represent the data string when embedding information such as encryption information in the data string. The embedded information may be any information (e.g., encryption information associated with encryption of an associated data string) added to the content of a data string in addition to its original data. Original data may be, e.g., names, addresses, Social Security Numbers, license numbers, account information, or any data originally stored in a data string. A data string that has been processed so that it contains both its original data and embedded data may be referred to as an augmented data string (or simply as an augmented string).

The processes involved in embedding information in data strings by data string augmentation may be performed by computing equipment 12 and applications 16 in system 10 (see, e.g., FIG. 1). Applications 16 may embed information in data strings of databases 18. An application 16 running on computing equipment 12 may embed information in a database 18 that is located on the same computing equipment 12. An application 16 may also use communications network 14 to embed information a database that is located on different computing equipment 12. If desired, data string augmentation may involve the use of encryption and decryption engines. These engines may be a part of applications 16.

An application 16 may encrypt a first data string (e.g., a credit card number or a Social Security Number associated with a name or address) using a managed encryption key and embed encryption information relating to the managed encryption key in an associated data string (e.g., a name or an address associated with the credit card number or Social Security Number) generating an associated augmented data string. The application may also, if desired, encrypt the associated data string or the associated augmented data string. If desired, the associated data string may be encrypted using the same managed encryption key or a different managed encryption key as that used to encrypt the first data string. The encryption information may be embedded in the associated data string after encryption of the associated data string so that the encryption information remains accessible for decryption of the data string.

An application 16 that embeds information in a data string may later retrieve the information from the augmented data string. An application 16 may also embed information that is later retrieved by a different application 16. Encryption information such as a key version number that is retrieved from an augmented data string may be used in recovering an encryption key for decrypting an associated data string.

Figure 3:
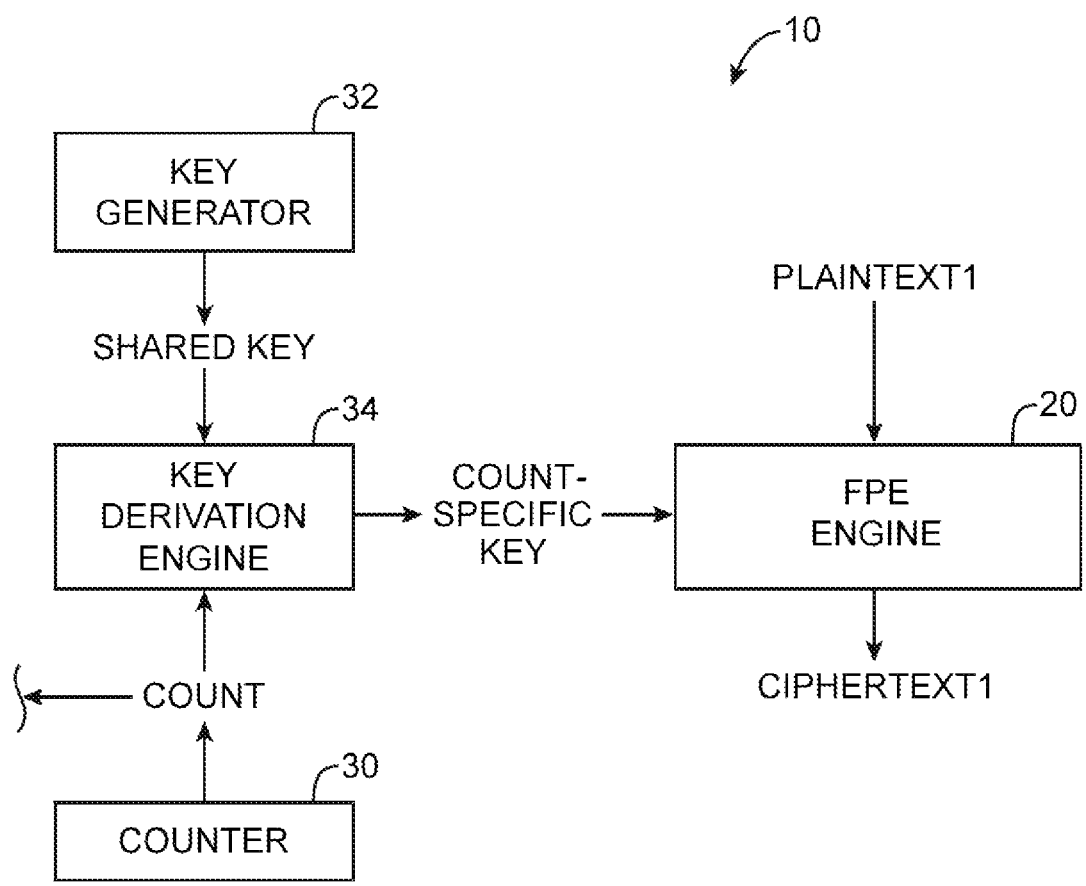
FIG. 3 is a diagram showing a format-preserving encryption engine and a key derivation engine in accordance with an embodiment of the present invention.
Figure 4:
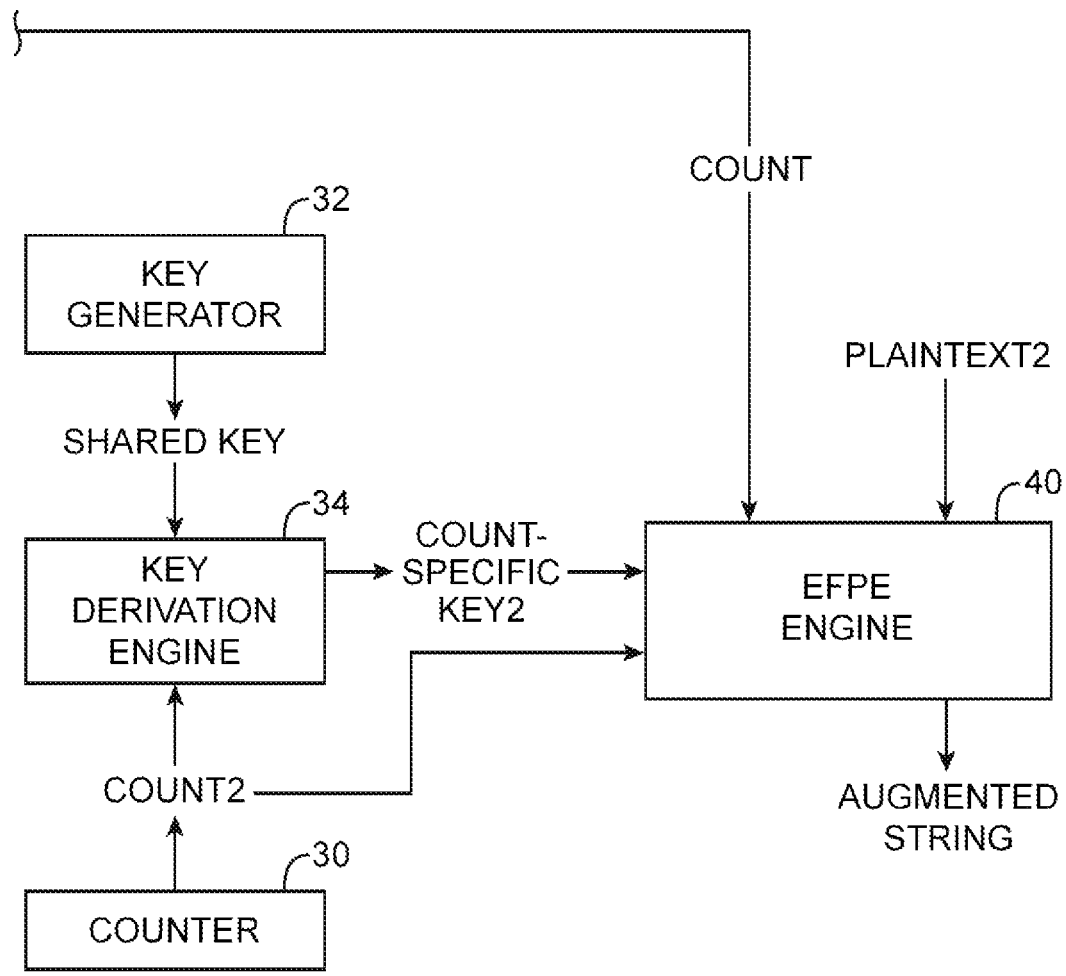
FIG. 4 is a diagram showing an embedded-format-preserving encryption engine and a key derivation engine in accordance with an embodiment of the present invention.

FIGS. 3 and 4 are, in combination, a diagram of a portion of system 10 showing how a data string (e.g., a data entry in a data file such as data file 19) may be encrypted using a managed encryption key and how information corresponding to the managed encryption key may be embedded in an associated data string.

Encryption and decryption engines in system 10 may be implemented using format-preserving cryptographic systems. These cryptographic engines are able to encrypt and decrypt a string without changing the string's format. The ability to preserve the format of a data string may greatly simplify system operations and may allow systems with legacy applications to be provided with cryptographic capabilities that would not be possible using conventional techniques. Encrypting and decrypting data strings while preserving the format of a data string may be performed in combination with embedding and extracting information in data strings.

Encryption engine 20 (or decryption engines, if desired) may be called by an application or may be part of an application 16 that is running on data processing system 10. Encryption engines may be part of an application 16 that performs data string augmentation. Encryption and decryption engines may also be part of an application 16 that is different from an application 16 that performs data string augmentation. Data string augmentation may also be performed by encryption and decryption engines.

As shown in FIG. 3, during encryption operations, an encryption engine such a format-preserving-encryption (FPE) engine 20 may encrypt an unencrypted string of characters such as PLAINTEXT1 (e.g., a data entry in data file 19) into an encrypted string of characters such as CIPHERTEXT1. FPE engine 20 may perform a format-preserving encryption that preserves the format of PLAINTEXT1 (e.g., a format-preserving encryption operation in which PLAINTEXT1 is a nine digit numerical string and CIPHERTEXT1 is also a nine digit numerical string).

FPE encryption engine 20 may generate CIPHERTEXT1 from PLAINTEXT1 using an encryption key such as a COUNT-SPECIFIC KEY that is specific to a value COUNT such as a number or a time generated by a counter such as counter 30. Counter 30 may generate a new value for COUNT after a certain period of time (e.g., each day, each hour, each month, or each year) or may generate a new value for COUNT for each encryption operation. Counter 30 may provide COUNT to a key derivation engine such as key derivation engine 34. A key generator such as key generator 32 may be configured to generate a shared key. The shared key may be provided to key derivation engine 34. Key derivation engine 34 may generate a COUNT-SPECIFIC KEY based on the shared key and the current value of COUNT.

As shown in FIG. 4, encryption information such as COUNT corresponding to the COUNT-SPECIFIC KEY used in the encryption of PLAINTEXT1 may be provided to an embedded-format-preserving-encryption (EFPE) engine such as EFPE engine 40. EFPE engine 40 may be configured to form an AUGMENTED STRING that includes COUNT and a second data string such as PLAINTEXT2 or, if desired, an encrypted version of PLAINTEXT2. EFPE engine 40 may be configured to embed COUNT in the AUGMENTED STRING by compressing, encrypting, compressing and encrypting or otherwise modifying PLAINTEXT2 to accommodate the additional encryption information (e.g., COUNT).

If desired, PLAINTEXT2 may be encrypted during EFPE operations in which encryption information such as COUNT (related to the encryption of PLAINTEXT1) is embedded in the AUGMENTED STRING. In the example of FIG. 4, EFPE engine 40 is configured to perform a format-preserving encryption operation to encrypt PLAINTEXT2 and to perform embedding operations. If desired, EFPE engine 40 may encrypt PLAINTEXT2 using a second count-specific key such as COUNT-SPECIFIC KEY 2. COUNT-SPECIFIC KEY 2 may be generated by key derivation engine 34 based on a shared key generated by key generator 32 and a second number such as COUNT2 generated by counter 30. However, this is merely illustrative. If desired, PLAINTEXT2 may be unencrypted, or PLAINTEXT2 may be encrypted using the same count-specific key used in encrypting PLAINTEXT1. CIPHERTEXT1, and the AUGMENTED STRING may be stored in associated fields 27 (e.g., in a common portion 25) of a data file such as data file 19.

The AUGMENTED STRING generated by EFPE engine 40 may include both COUNT and, if desired, COUNT2. If desired, PLAINTEXT2 may be compressed in order to accommodate the additional encryption information (e.g., COUNT, COUNT2 or other key management data). If desired, PLAINTEXT2 may be encrypted. PLAINTEXT2 may be encrypted prior to embedding encryption data such as COUNT into the AUGMENTED STRING. If desired, COUNT may be embedded in PLAINTEXT2 prior to encryption. In this way, encryption information such as COUNT may be stored in an encrypted form and accessed by first decrypting the AUGMENTED STRING and then extracting the encryption information from the decrypted AUGMENTED STRING.

Figure 5:
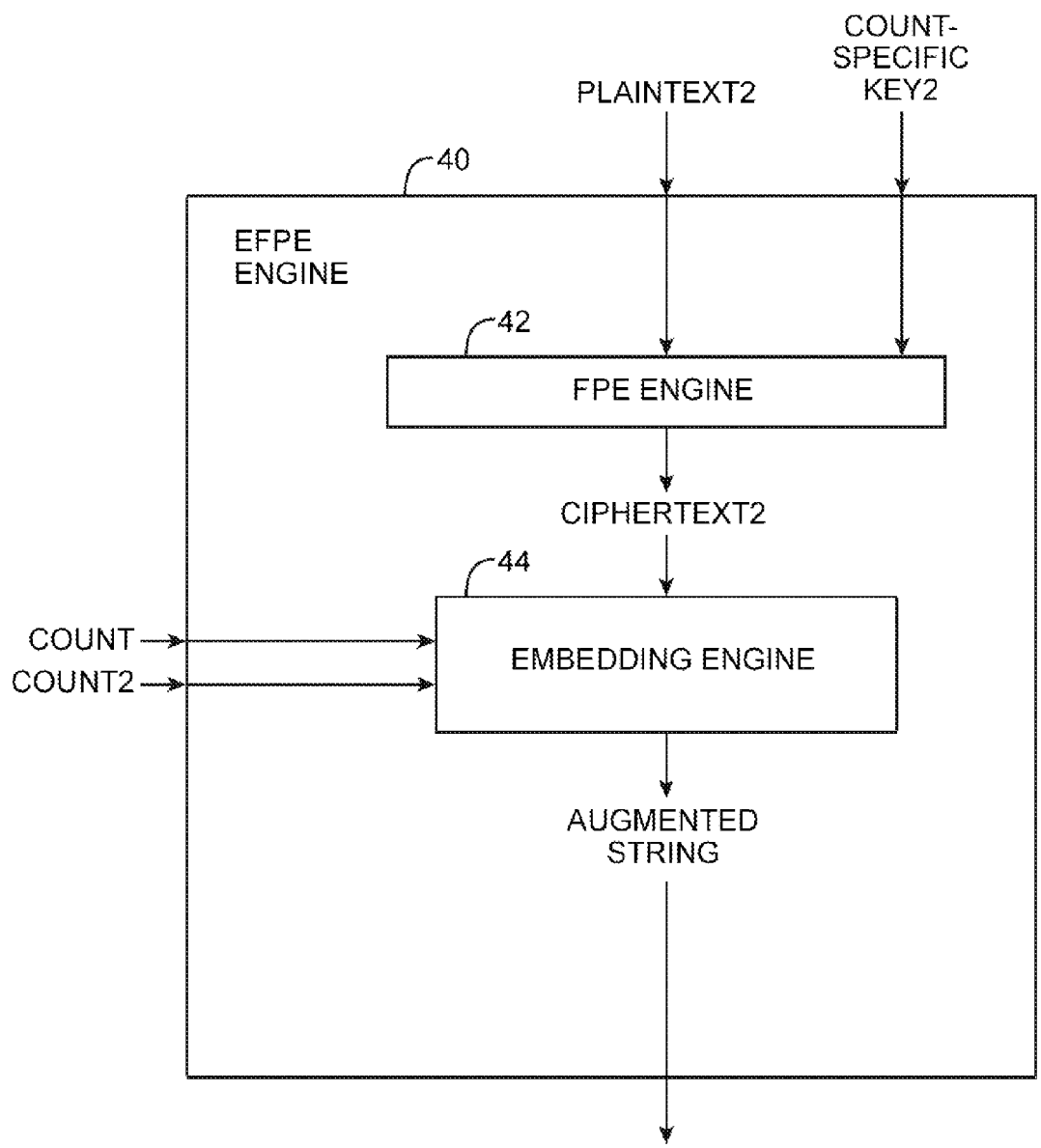
FIG. 5 is a diagram showing how an embedded-format-preserving encryption engine may encrypt a data string and embed information in the encrypted data string in accordance with an embodiment of the present invention.

A diagram showing how PLAINTEXT2 may be encrypted prior to augmentation is shown in FIG. 5. In the example of FIG. 5, PLAINTEXT2, COUNT-SPECIFIC KEY 2, COUNT and COUNT2 are provided to EFPE engine 40. PLAINTEXT2 may be a data entry such as a name or address in a field 27 of data file 19 (see e.g., FIG. 2A, 2B or 2C). COUNT may be key management data corresponding to a COUNT-SPECIFIC KEY that was used to encrypt PLAINTEXT1 of FIG. 3. COUNT-SPECIFIC KEY 2 may have been generated by key derivation engine 34 based on a shared encryption key and COUNT2. COUNT2 may have been generated by a counting component such as counter 30.

As shown in FIG. 5, EFPE engine 40 may include an encryption engine such as FPE engine 42 and an embedding engine such as embedding engine 44. PLAINTEXT2 may be encrypted in a format-preserving encryption operation by FPE engine 42 based on COUNT-SPECIFIC KEY 2 to form an encrypted string such as CIPHERTEXT2. Following encryption of PLAINTEXT2, encryption information such as key management data (e.g., COUNT and COUNT2) may be embedded in CIPHERTEXT2 by embedding engine 44 to form the AUGMENTED STRING. The AUGMENTED STRING may be stored in, for example, data file 19.

Figure 6:
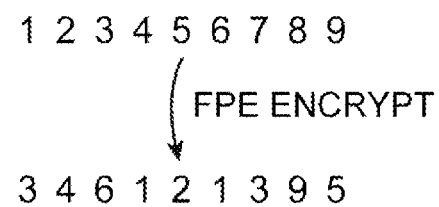
FIG. 6 is a diagram showing how information may be encrypted while preserving the structure and format of the information in accordance with an embodiment of the present invention.

An example of encrypting a data string using format-preserving encryption is shown in FIG. 6. As shown in FIG. 6, a nine digit numerical string (e.g., 123456789) may be encrypted to form a corresponding encrypted nine digit numerical string (e.g., 346121395).

Figure 7:
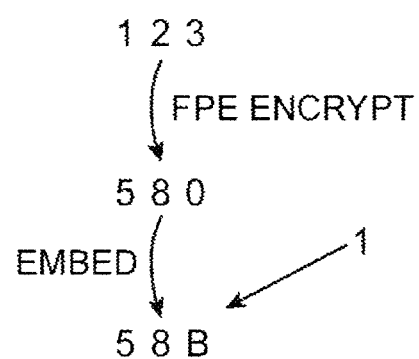
FIG. 7 is a diagram showing how information may be embedded in a data string that has been encrypted using format-preserving encryption in accordance with an embodiment of the present invention.

An example of embedding information in a ciphertext that has been generated in a format-preserving encryption operation is shown in FIG. 7. As shown in FIG. 7, a numerical string (e.g., 123) may be encrypted using a format-preserving encryption operation to form a three digit numerical ciphertext (e.g., 580).

Following the format-preserving encryption operations, additional data (e.g., 1) may be embedded in one of the digits of the ciphertext (e.g., by mapping the number 0 to an expanded character space containing numbers and letters in which a value of B encodes both an encrypted digit 0 and an embedded value 1). The format of a string such as PLAINTEXT2 may be altered in this type of operation to include letters or other characters in addition to numerical characters. Embedding encryption information in, for example, CIPHERTEXT2, may allow CIPHERTEXT1 to be generated using a managed encryption key while retaining the same format as PLAINTEXT1.

Figure 8:
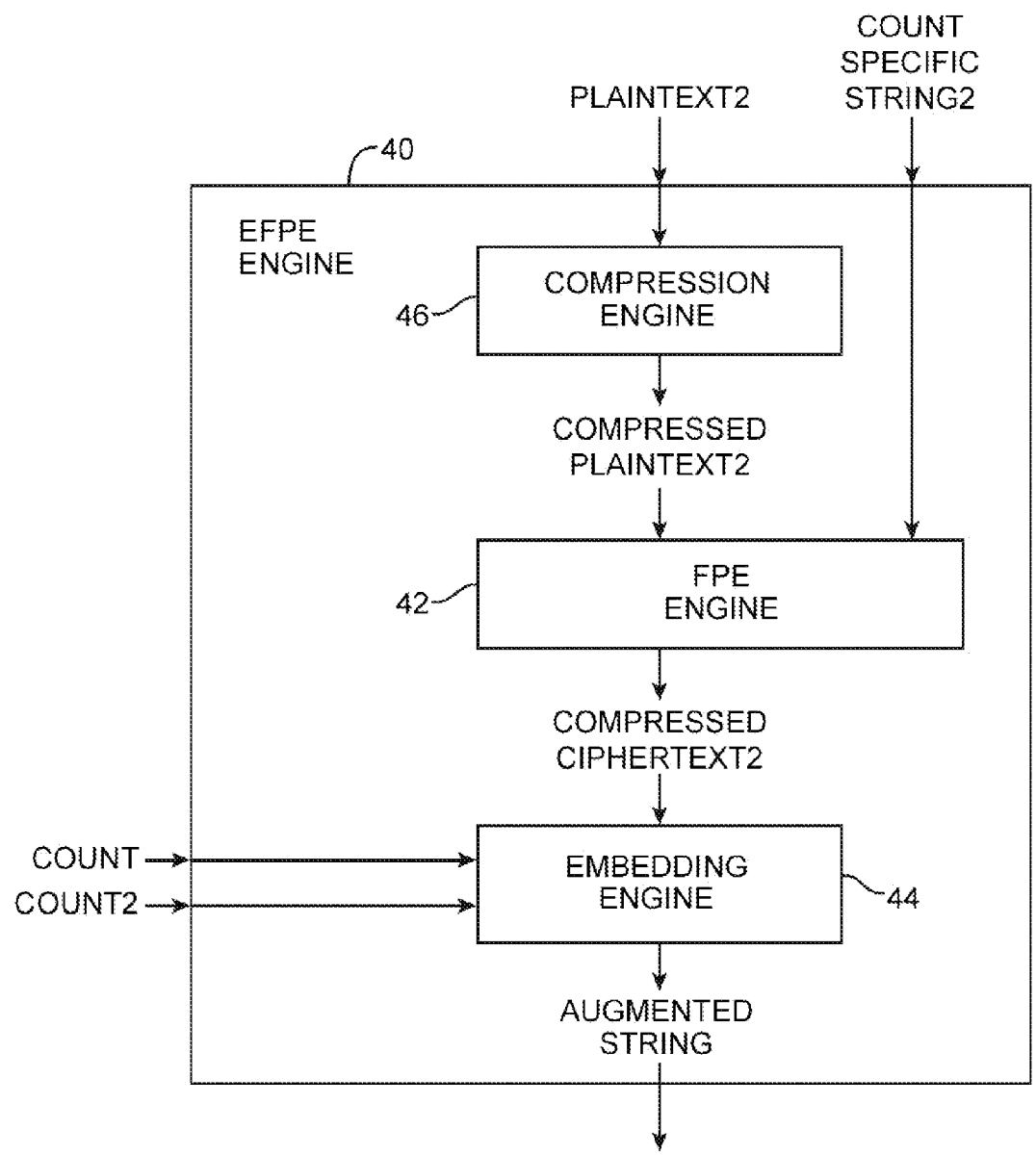
FIG. 8 is a diagram showing how an embedded-format-preserving encryption engine may compress, encrypt and embed information in a data string in accordance with an embodiment of the present invention.

A diagram showing how PLAINTEXT2 may be compressed prior to encryption and augmentation is shown in FIG. 8. In the example of FIG. 8, PLAINTEXT2, COUNT-SPECIFIC KEY 2, COUNT and COUNT2 are provided to EFPE engine 40.

As shown in FIG. 8, EFPE engine 40 may include a compression engine such as compression engine 46, an encryption engine such as FPE engine 42 and an embedding engine such as embedding engine 44. PLAINTEXT2 may be compressed by compression engine 46 to form COMPRESSED PLAINTEXT2. Compression engine 46 may compress PLAINTEXT2 by, for example, mapping PLAINTEXT2 to an expanded character set (e.g., by rewriting a name having alphabetical characters into a character space having alphabetical, numerical and special characters). In this way, the length of PLAINTEXT2 may be reduced to create space (e.g., in a field of the table of FIG. 2A containing PLAINTEXT2) for embedding additional encryption information such as COUNT, COUNT2 or other key management data associated with the encryption of PLAINTEXT1.

Following compression, COMPRESSED PLAINTEXT2 may be encrypted in a format-preserving encryption operation by FPE engine 42 using COUNT-SPECIFIC KEY 2 to form an encrypted compressed string such as COMPRESSED CIPHERTEXT2. Following compression and encryption of PLAINTEXT2, encryption information such as key management data (e.g., COUNT and COUNT2) may be embedded in CIPHERTEXT2 using embedding engine 44 to form the AUGMENTED STRING. The AUGMENTED STRING containing the encrypted version of PLAINTEXT2 and the encryption information COUNT may be stored in, for example, data file 19.

Figure 9:
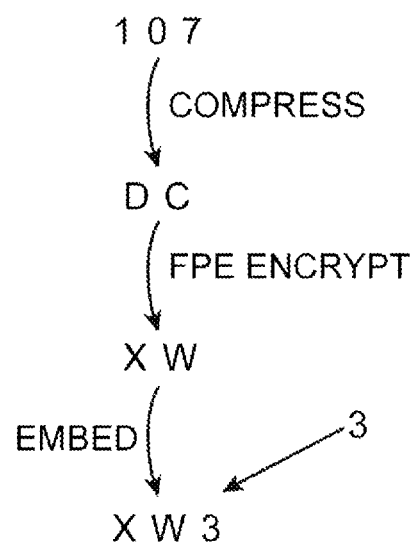
FIG. 9 is a diagram showing how information may be compressed prior to format-preserving encryption and embedding of encryption information in the data string in accordance with an embodiment of the present invention.

An example of embedding information in a ciphertext that has been generated in a format-preserving encryption operation performed on a compressed data string is shown in FIG. 9. As shown in FIG. 9, a numerical string (e.g., 107) may be compressed to form a shorter alphanumeric string (e.g., DC) by representing the numerical string in an expanded character set (e.g., a character set having numbers, letters and, if desired, special characters such as the percent sign).

In the example of FIG. 9, the compressed data string may then by encrypted using a format-preserving encryption operation to form an alphanumerical ciphertext (e.g., XW). Following the format-preserving encryption operation, additional data (e.g., 3) may be embedded in the compressed ciphertext.

As shown in FIG. 9, the additional data may be embedded in the compressed ciphertext by appending the additional data in the space generated by compressing the unencrypted data string prior to encryption. However, this is merely illustrative. If desired, the additional data may be pre-pended, may be inserted anywhere in or may be otherwise embedded in the compressed ciphertext (e.g., by further expanding the character space of one of the digits of the compressed ciphertext).

The format of PLAINTEXT2 may be altered in this type of operation to include letters or other characters in addition to numerical characters. Embedding encryption information in PLAINTEXT2 as shown in FIGS. 8 and 9 may allow CIPHERTEXT1 to be encrypted using a managed encryption key while retaining the same format as PLAINTEXT1.

Figure 10:
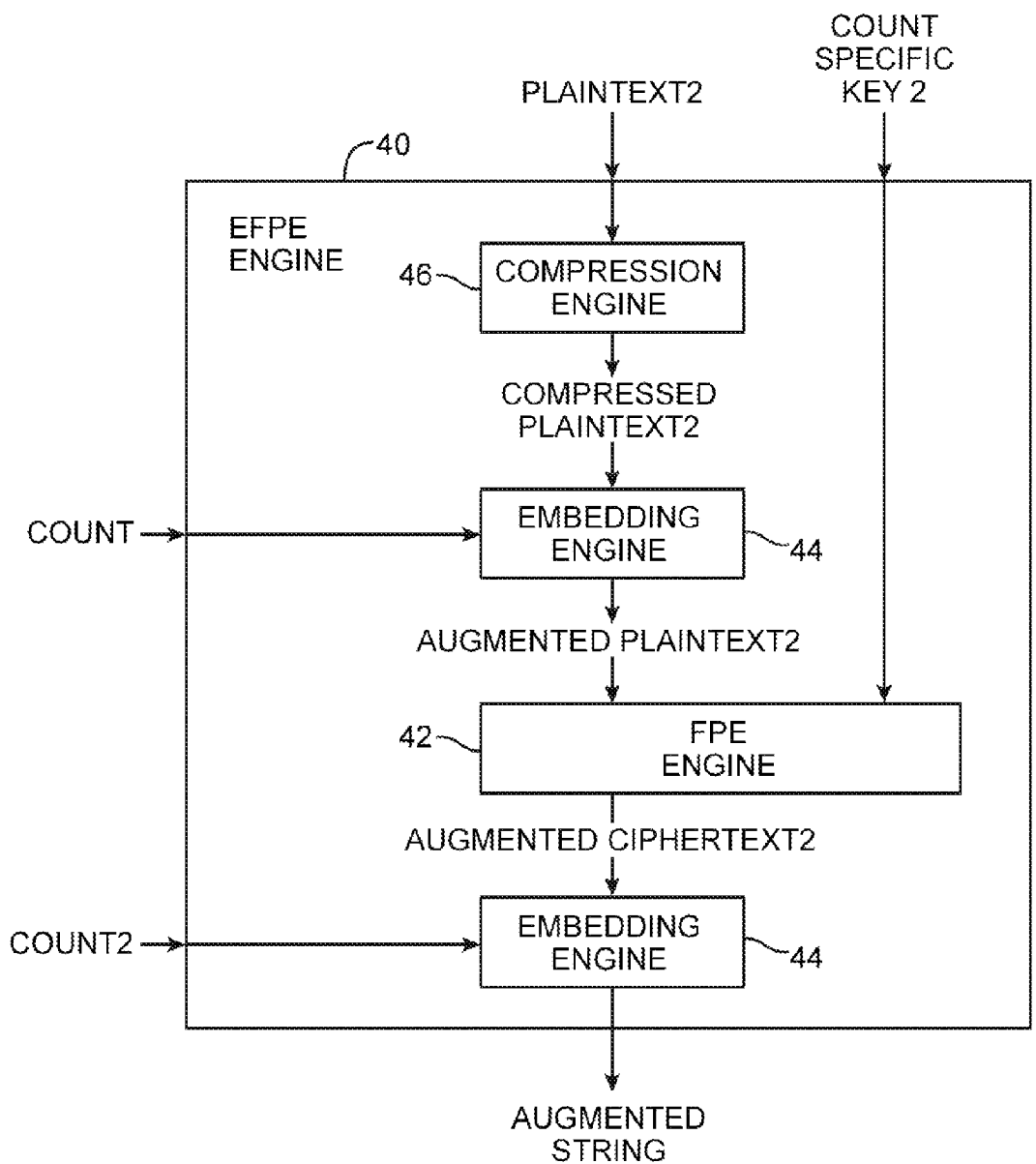
FIG. 10 is a diagram showing how an embedded-format-preserving encryption engine may compress, embed information in, and encrypt a data string in accordance with an embodiment of the present invention.

A diagram showing how encryption data associated with the encryption of PLAINTEXT1 may be encrypted together with PLAINTEXT2 is shown in FIG. 10. In the example of FIG. 10, PLAINTEXT2, COUNT-SPECIFIC KEY 2, COUNT and COUNT2 are provided to EFPE engine 40.

As shown in FIG. 10, EFPE engine 40 may include a compression engine such as compression engine 46, an encryption engine such as FPE engine 42 and one or more embedding engines such as embedding engines 44. A string such as PLAINTEXT2 may be compressed by compression engine 46 to form a shorter string such as COMPRESSED PLAINTEXT2.

Compression engine 46 may compress PLAINTEXT2 by, for example, rewriting PLAINTEXT2 using an expanded character set (e.g., rewriting a name having alphabetical characters in a character space having alphabetical, numerical and special characters). In this way, the length of PLAINTEXT2 may be reduced to create space for embedding additional encryption information such as COUNT, COUNT2 or other key management data associated with the encryption of PLAINTEXT1.

Following compression of PLAINTEXT2, encryption information such as key management data (e.g., COUNT) associated with the encryption of PLAINTEXT1 may be embedded in COMPRESSED PLAINTEXT2 using embedding engine 44 to form AUGMENTED PLAINTEXT2.

Following embedding of COUNT into COMPRESSED PLAINTEXT2, AUGMENTED PLAINTEXT2 may be encrypted in a format-preserving encryption operation by FPE engine 42 using COUNT-SPECIFIC KEY 2 to form an augmented encrypted compressed string such as AUGMENTED CIPHERTEXT2. Following compression, encryption, and augmentation of PLAINTEXT2, further encryption information such as key management data (e.g., COUNT2) associated with the encryption of AUGMENTED PLAINTEXT2 may be embedded in AUGMENTED CIPHERTEXT2 using embedding engine 44 to form the final AUGMENTED STRING. The AUGMENTED STRING may be stored in, for example, data file 19. In this example, the AUGMENTED STRING may include unencrypted encryption information (e.g., COUNT2) and encrypted information (e.g., AUGMENTED CIPHERTEXT2) that includes encrypted key management data (e.g., COUNT) associated with the encryption of PLAINTEXT1 and an encrypted version of PLAINTEXT2.

Figure 11:
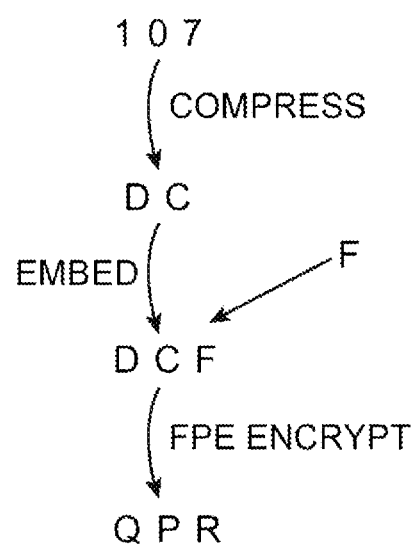
FIG. 11 is a diagram showing how information may be embedded in a compressed data string prior to format-preserving encryption of the data string in accordance with an embodiment of the present invention.

An example of embedding information in a data string prior to FPE encryption is shown in FIG. 11. As shown in FIG. 11, a numerical string (e.g., 107) may be compressed to form a shorter alphanumeric string (e.g., DC) by representing the numerical string in an expanded character set (e.g., a character set having numbers, letters and, if desired, special characters such as the percent sign).

Additional data (e.g., F) may be embedded in the compressed string. As shown in FIG. 11, the additional data may be embedded in the compressed string by appending the additional data in the space generated by compressing the unencrypted data string. However, this is merely illustrative. If desired, the additional data may be pre-pended, may be inserted anywhere or may be otherwise embedded in the compressed data string (e.g., by further expanding the character space of one of the digits of the compressed ciphertext).

In the example of FIG. 11, the compressed data string having the additional data may then by encrypted using a format-preserving encryption operation to form an alphanumeric ciphertext (e.g., QPR). In this way, encryption information that has been used to generate an FPE encrypted string (e.g., F) may be stored in encrypted form in another encrypted string.

The format of string such as PLAINTEXT2 may be altered in this type of operation to include characters in an expanded character set compared with the character set of original PLAINTEXT2. Embedding encryption information in PLAINTEXT2 as shown in FIGS. 10 and 11 may allow PLAINTEXT1 to be encrypted using a managed encryption key while retaining the original format of PLAINTEXT1.

Figure 12:
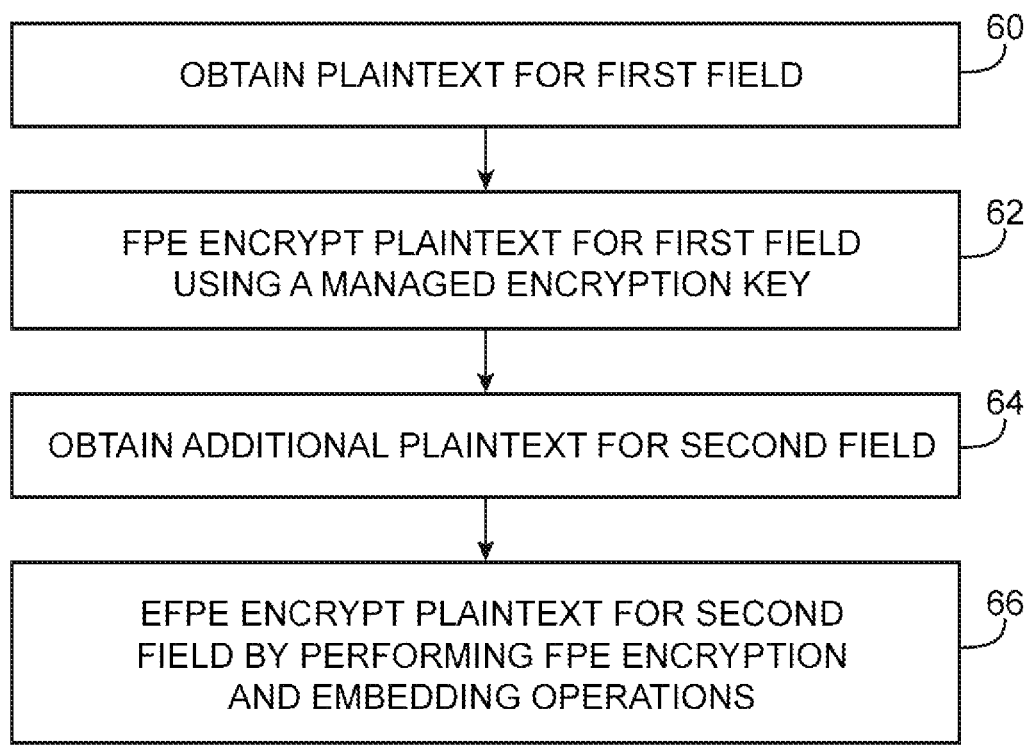
FIG. 12 is a flow chart of illustrative steps that may be used in encrypting a first data string and embedding encryption-information in an encrypted additional data string in accordance with an embodiment of the present invention.

FIG. 12 is a flow chart of illustrative steps that may be used by computing equipment 12 in encrypting, compressing, and embedding information as in the examples of FIGS. 3-11.

In step 60, a plaintext string may be obtained by computing equipment 12 from, for example, a field in a table stored on one of databases 18 (FIG. 1). The plaintext string may be a Social Security Number, a payment card number, a license number or other string having a specific format.

In step 62, the plaintext string may be encrypted. Encryption of the plaintext string may include a format-preserving (FPE) encryption operation or a structure-preserving encryption (SPE) operation that preserves the format or the structure of the plaintext string. Encryption of the plaintext string may be based on a managed encryption key that corresponds to encryption information such as a key version number.

In step 64, an additional plaintext string may be obtained by computing equipment 12 from, for example, an associated field in the table stored on one of databases 18. The associated field may be located in a common row of the table with the field from which the plaintext string in step 60 was obtained. The additional plaintext string may be, for example, a name or an address associated with the plaintext string obtained in step 60 and encrypted in step 62.

In step 66, an embedded-format-preserving encryption EFPE process may be used to encrypt and embed encryption information in the additional plaintext string. The embedded encryption information may be, for example, the specific number (e.g., the count) corresponding to the managed encryption key that was used in encrypting the plaintext string (in step 62).

If desired, in step 66, the additional plaintext string may be FPE encrypted and the encryption information may be embedded in the FPE encrypted string as in the examples of FIGS. 5 and 7. If desired, in step 66, the additional plaintext string may be compressed, the compressed plaintext string may be FPE encrypted, and the encryption information may be embedded in the FPE encrypted compressed string as in the examples of FIGS. 8 and 9. If desired, in step 66, the additional plaintext string may be compressed, the encryption information may be embedded in the compressed plaintext string and the compressed plaintext string and the encryption information may be FPE encrypted as in the examples of FIGS. 10 and 11.

Figure 13:
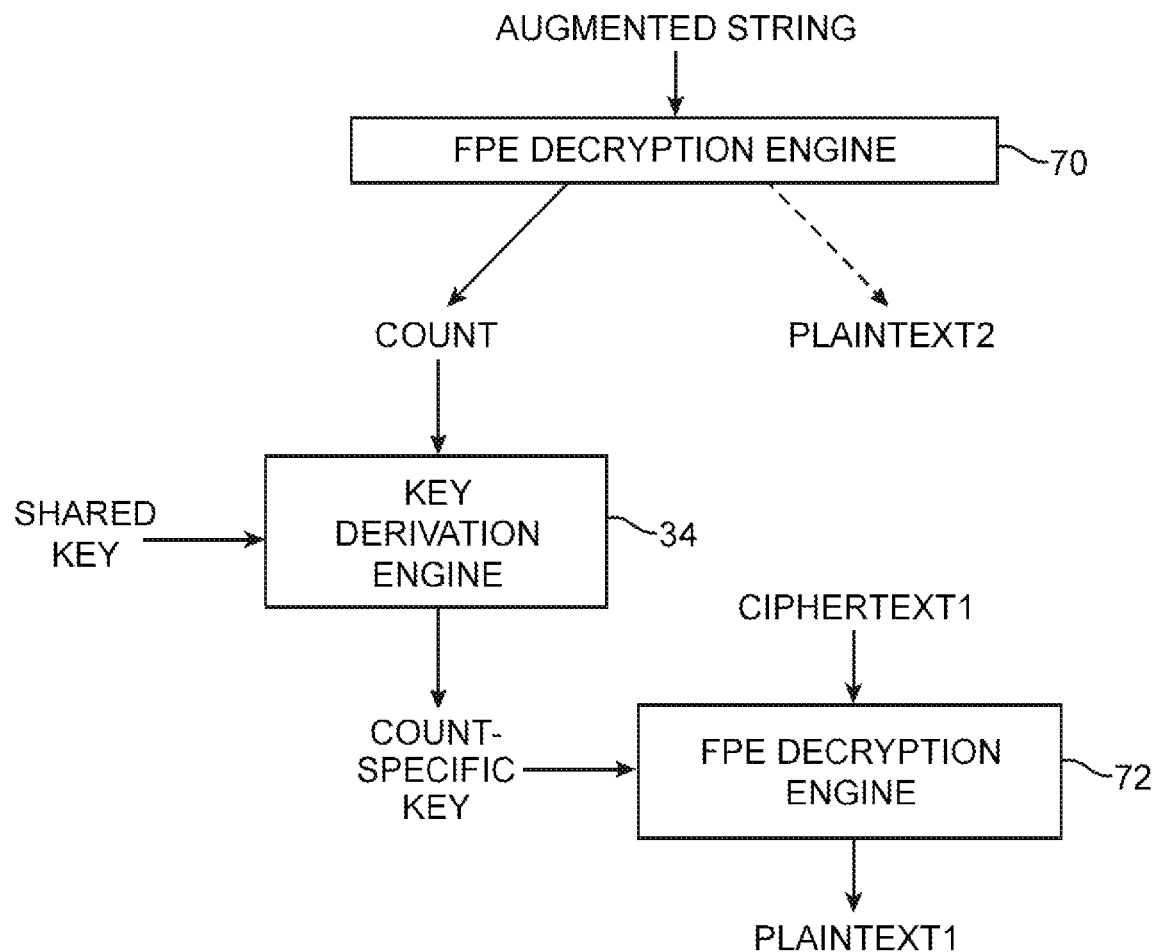
FIG. 13 is a diagram showing how embedded information in an augmented data string may be used to decrypt an encrypted data string in accordance with an embodiment of the present invention.

A user may wish to access encrypted information such as encrypted data entries stored in a data file such as data file 19 on a database such as one of databases 18 of FIG. 1. In order to access encrypted data, an FPE decryption engine and an EFPE decryption engine may be used to extract encryption information from a first encrypted field and to use that encryption information to decrypt a second FPE-encrypted field as shown in FIG. 13. Decryption engine 72 and EFPE decryption engine 70 may be used to decrypt a string that has been encrypted using the process of FIG. 12. Decryption engine 72 and EFPE decryption engine 70 may be invoked by an application 16 or may be part of an application 16 that is running on the computing equipment of data processing system 10.

As shown in FIG. 13, a data string such as AUGMENTED STRING may be obtained by (or provided to) an EFPE decryption engine such as EFPE decryption engine 70. EFPE decryption engine 70 may be used to extract encryption information (e.g., COUNT) from the AUGMENTED STRING that was used in generating CIPHERTEXT1. EFPE decryption engine 70 may, if desired, also be used to decrypt encrypted portions of the AUGMENTED STRING. Encrypted portions of the AUGMENTED STRING may include the encryption information and/or an additional encrypted string associated with CIPHERTEXT1.

Encryption information such as encryption key management data (e.g., a key version number such as COUNT) that is extracted from the AUGMENTED STRING by EFPE decryption engine 70 may be provided to a key derivation engine such as key derivation engine 34. Key derivation engine 34 may be configured to receive the encryption key management data (e.g., COUNT) from EFPE decryption engine 70 and to receive a shared encryption key such as SHARED KEY. Key derivation engine 34 may be configured to obtain or generate the count-specific encryption key (e.g., COUNT-SPECIFIC KEY) that was used to encrypt PLAINTEXT1 from the SHARED KEY and COUNT.

The COUNT-SPECIFIC KEY and CIPHERTEXT1 may be provided to FPE decryption engine 72. FPE decryption engine 72 may be configured to use the COUNT-SPECIFIC KEY to decrypt CIPHERTEXT1 and thereby recover PLAINTEXT1 (e.g., FPE encrypted data from databases 18).

Figure 14:
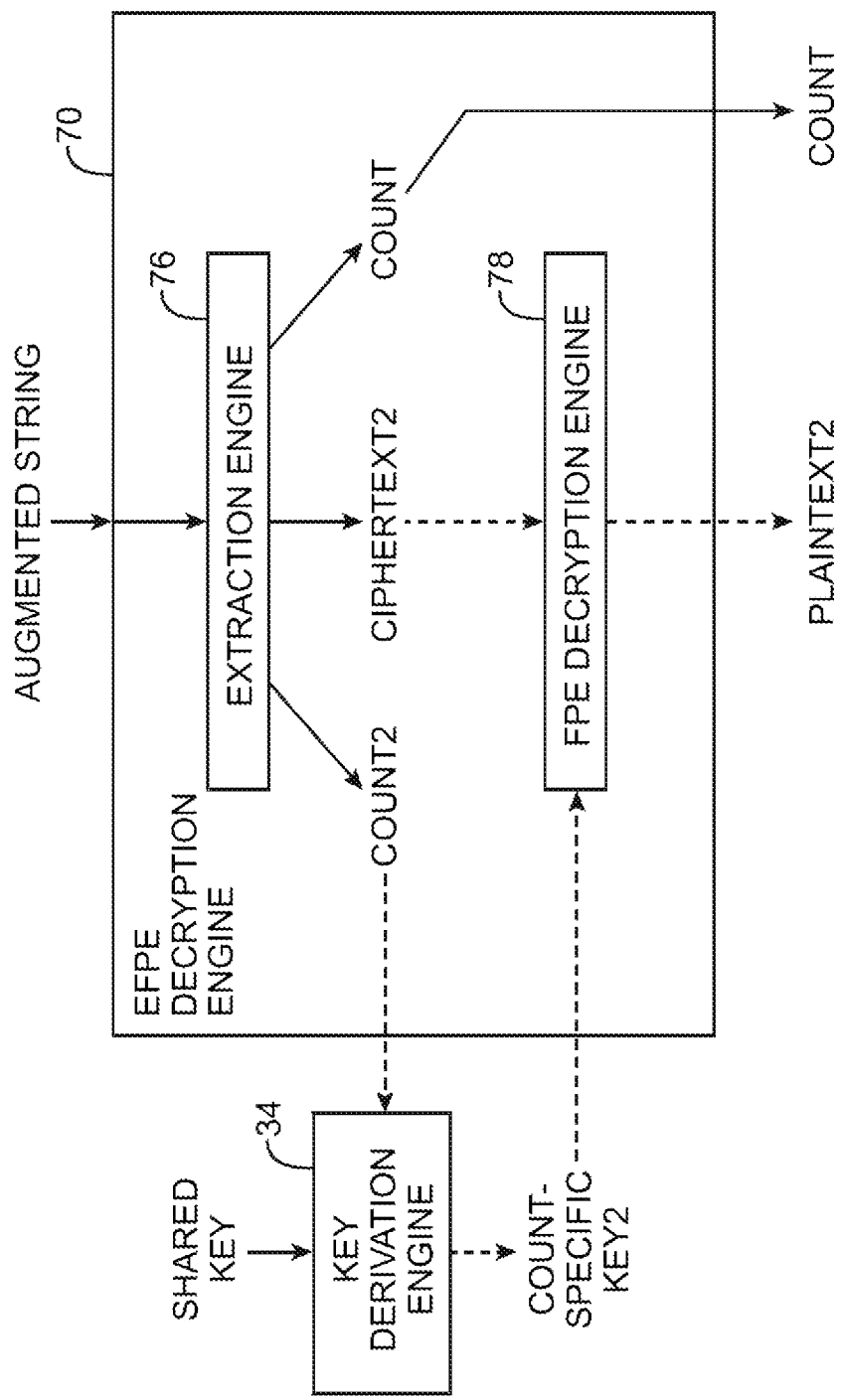
FIG. 14 is a diagram showing how an embedded-format-preserving-encryption decryption engine may be used to extract encryption information from an augmented data string having a portion that has been encrypted using an encryption engine of the type shown in FIG. 5 in accordance with an embodiment of the present invention.
Figure 15:
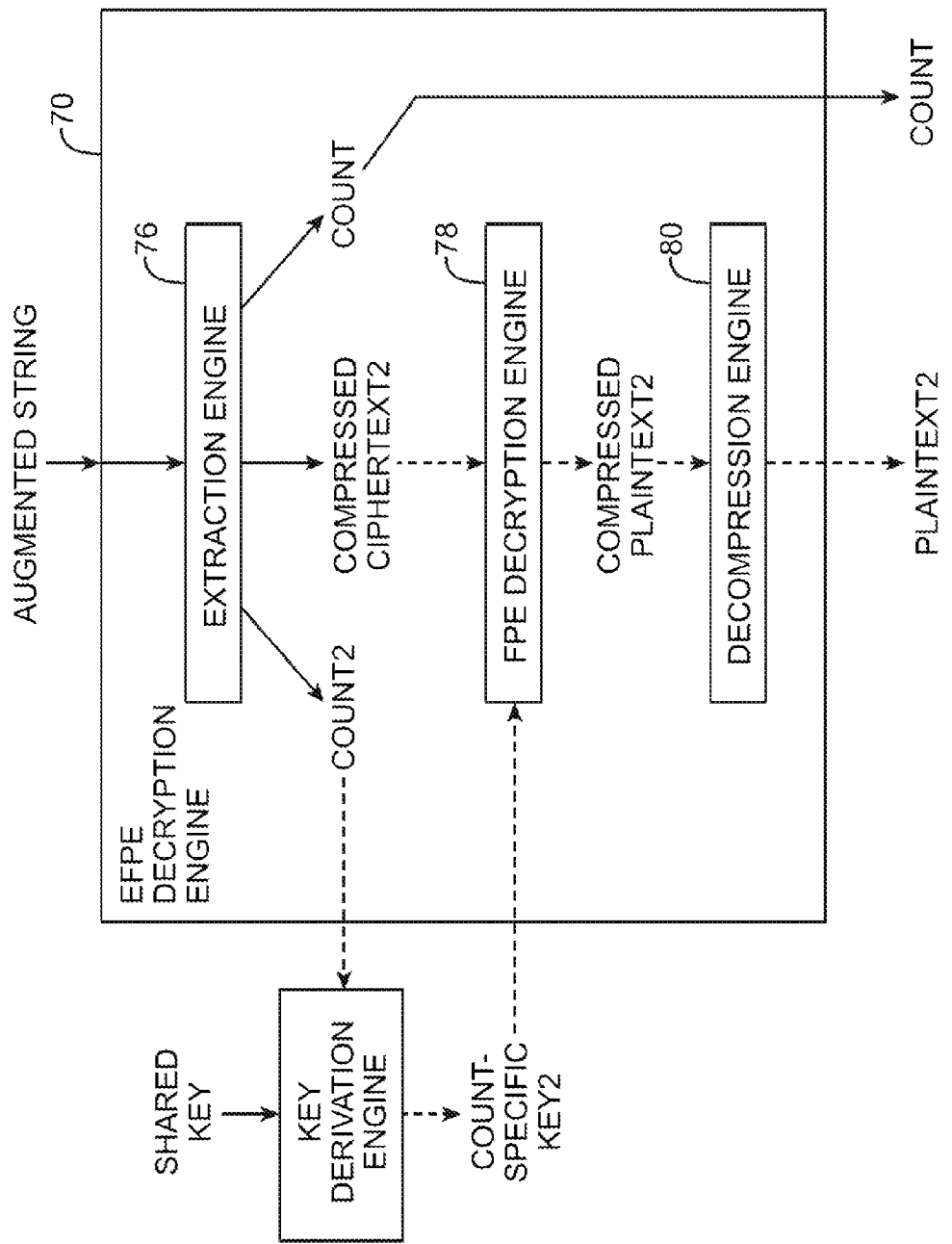
FIG. 15 is a diagram showing how an embedded-format-preserving-encryption decryption engine may be used to extract encryption information from an augmented data string having a portion that has been encrypted using an encryption engine of the type shown in FIG. 8 in accordance with an embodiment of the present invention.
Figure 16:
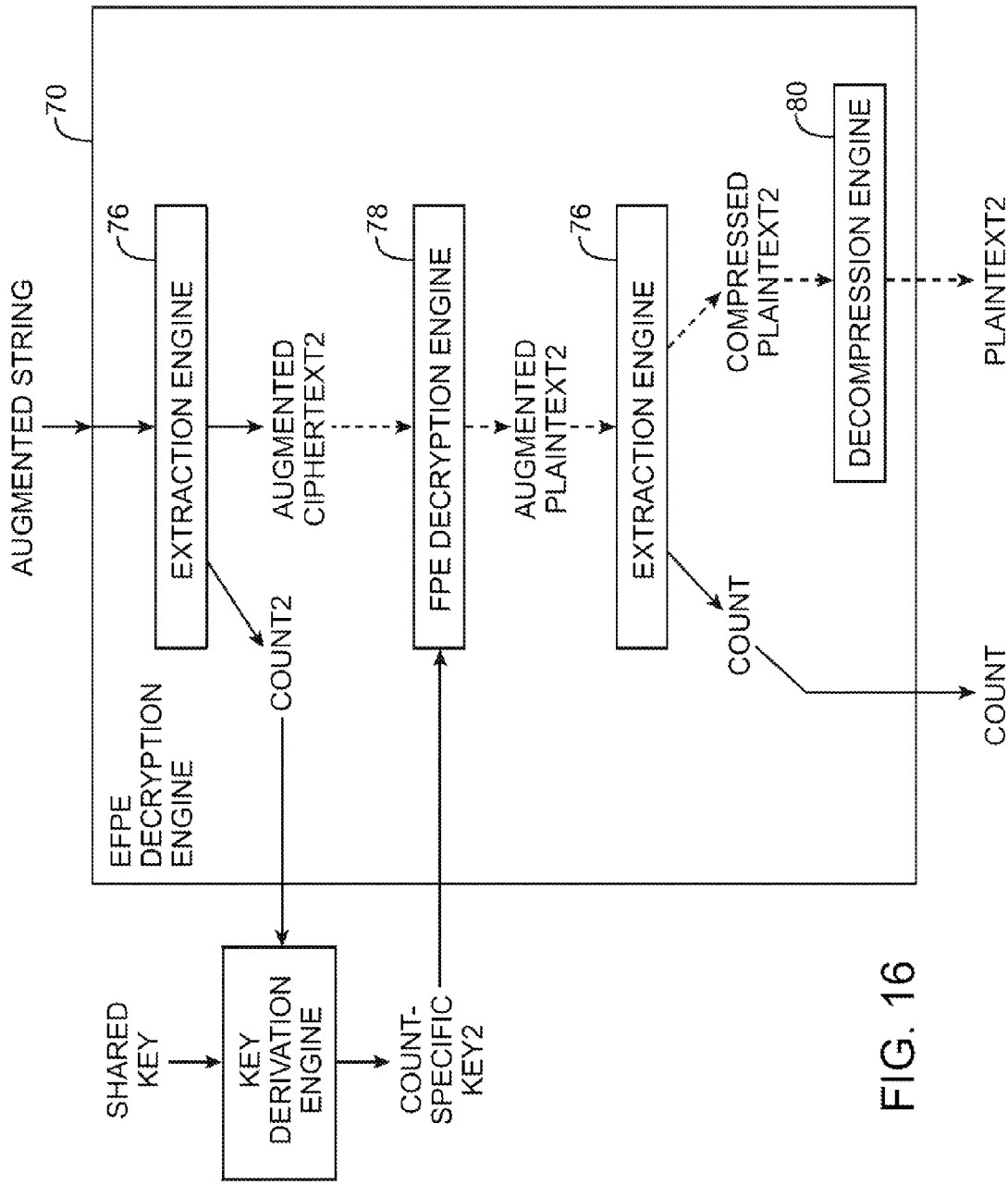
FIG. 16 is a diagram showing how an embedded-format-preserving-encryption decryption engine may be used to decrypt and extract encryption information from an augmented data string that has been encrypted using an encryption engine of the type shown in FIG. 10 in accordance with an embodiment of the present invention.

FIGS. 14, 15, and 16 show how encryption information (e.g., key management data such as COUNT) and, if desired, PLAINTEXT2 may be recovered from an AUGMENTED STRING that was generated as shown in FIGS. 5, 8, and 10 respectively (e.g., by reversing processes such as those shown in FIGS. 7, 9, and 11 respectively).

As shown in FIG. 14, an AUGMENTED STRING that includes embedded encryption information that was used to encrypt a data string may be provided to EFPE decryption engine 70. The AUGMENTED STRING may be obtained, for example, from one of databases 18 of FIG. 1. In the example of FIG. 14, EFPE decryption engine 70 includes extraction engine 76 and FPE decryption engine 78. Extraction engine 76 may be configured to extract embedded encryption information such as COUNT from the AUGMENTED STRING.

Extraction engine 76 may extract embedded information from the AUGMENTED STRING in part by decoding a portion of the AUGMENTED STRING in which both the embedded information (e.g., COUNT) and a portion of an additional data string (e.g., a portion of CIPHERTEXT2) were encoded (e.g., by mapping a member of the AUGMENTED STRING to multiple members in a smaller character space). However, this is merely illustrative, extraction engine 76 may extract the embedded information from the AUGMENTED STRING by decompressing a compressed string, by selecting and extracting one of the digits of the AUGMENTED STRING or using other suitable extraction methods. COUNT may then be provided to a key derivation engine such as key derivation engine 34 of FIG. 13 to be used in decrypting CIPHERTEXT1.

If desired, EFPE decryption engine 70 may also be used to decrypt encrypted information in the AUGMENTED STRING (e.g., CIPHERTEXT2). Following extraction of COUNT, additional encryption information (e.g., COUNT2) such as key management data that was used in encrypting PLAINTEXT2 to generate CIPHERTEXT2 may be provided to key derivation engine 34. Key derivation engine 34 may be configured to recover COUNT-SPECIFIC KEY 2 using the SHARED KEY and COUNT2. COUNT-SPECIFIC KEY 2 and CIPHERTEXT2 may be provided to FPE decryption engine 78. FPE decryption engine 78 may decrypt CIPHERTEXT2 using COUNT-SPECIFIC KEY 2 (e.g., the encryption key that was used in encrypting PLAINTEXT2 to generate CIPHERTEXT2). However, this is merely illustrative. EFPE decryption engine 70 may, if desired, extract COUNT from AUGMENTED STRING without decrypting CIPHERTEXT2.

As shown in FIG. 15, EFPE decryption engine 70 may include extraction engine 76, FPE decryption engine 78, and decompression engine 80. Extraction engine 76 may be configured to extract embedded encryption information such as COUNT from the AUGMENTED STRING. In the example of FIG. 15, extraction engine 76 may extract embedded information from the AUGMENTED STRING in part selecting a digit of the AUGMENTED STRING that was embedded in the AUGMENTED STRING after compression of PLAINTEXT2 (see FIG. 8). COUNT may then be provided to a key derivation engine such as key derivation engine 34 of FIG. 13 to be used in decryption of CIPHERTEXT1.

If desired, EFPE decryption engine 70 may also be used to decrypt encrypted information in the AUGMENTED STRING (e.g., COMPRESSED CIPHERTEXT2). Following extraction of COUNT, additional encryption information (e.g., COUNT2) such as key management data that was used in encrypting PLAINTEXT2 to generate CIPHERTEXT2 may be provided to key derivation engine 34.

Key derivation engine 34 may be configured to recover COUNT-SPECIFIC KEY 2 using the SHARED KEY and COUNT2. COUNT-SPECIFIC KEY 2 and COMPRESSED CIPHERTEXT2 may be provided to FPE decryption engine 78. FPE decryption engine 78 may decrypt COMPRESSED CIPHERTEXT2 using COUNT-SPECIFIC KEY 2 (e.g., the encryption key that was used in encrypting COMPRESSED PLAINTEXT2 to generate COMPRESSED CIPHERTEXT2) to recover COMPRESSED PLAINTEXT2.

Following decryption of COMPRESSED CIPHERTEXT2, COMPRESSED PLAINTEXT2 may be provided to decompression engine 80. Decompression engine 80 may be configured to decompress COMPRESSED PLAINTEXT2 (e.g., by mapping COMPRESSED PLAINTEXT2 back into a smaller character space) to recover PLAINTEXT2. However, this is merely illustrative. EFPE decryption engine 70 may, if desired, extract COUNT from AUGMENTED STRING without decrypting or decompressing COMPRESSED CIPHERTEXT2.

As shown in FIG. 16, EFPE decryption engine 70 may include one or more extraction engines 76, FPE decryption engine 78, and decompression engine 80. An extraction engine such as one of extraction engines 76 may be configured to extract embedded encryption information such as COUNT2 from the AUGMENTED STRING. In the example of FIG. 16, extraction engine 76 may extract COUNT2 from the AUGMENTED STRING in part selecting a digit of the AUGMENTED STRING that was embedded in the AUGMENTED STRING after encryption of an augmented string (containing embedded encrypted information) such as AUGMENTED PLAINTEXT2 (see FIG. 10). COUNT2 may then be provided to a key derivation engine such as key derivation engine 34

Key derivation engine 34 may be configured to recover COUNT-SPECIFIC KEY 2 using the SHARED KEY and COUNT2. COUNT-SPECIFIC KEY 2 and COMPRESSED CIPHERTEXT2 may be provided to FPE decryption engine 78. FPE decryption engine 78 may decrypt AUGMENTED CIPHERTEXT2 using COUNT-SPECIFIC KEY 2 (e.g., the encryption key that was used in encrypting AUGMENTED PLAINTEXT2 to generate AUGMENTED CIPHERTEXT2) to recover AUGMENTED PLAINTEXT2.

Extraction engines 76 may be configured to extract embedded encryption information such as COUNT from the recovered AUGMENTED PLAINTEXT2. COUNT may then be provided to a key derivation engine such as key derivation engine 34 of FIG. 13 to be used in decryption of CIPHERTEXT1. In the example of FIG. 16, a portion of the AUGMENTED STRING must be decrypted before key management data corresponding to CIPHERTEXT1 can be extracted. However, this is merely illustrative. As shown in FIGS. 5, 8, 14, and 15, key management data may be embedded in unencrypted form in the AUGMENTED STRING.

Following extraction of COUNT from AUGMENTED PLAINTEXT2, COMPRESSED PLAINTEXT2 may, if desired, be provided to decompression engine 80. Decompression engine 80 may be configured to decompress COMPRESSED PLAINTEXT2 (e.g., by mapping COMPRESSED PLAINTEXT2 back into a smaller character space) to recover PLAINTEXT2. However, this is merely illustrative. EFPE decryption engine 70 may, if desired, extract COUNT from AUGMENTED PLAINTEXT2 without decompressing COMPRESSED CIPHERTEXT2.

Figure 17:
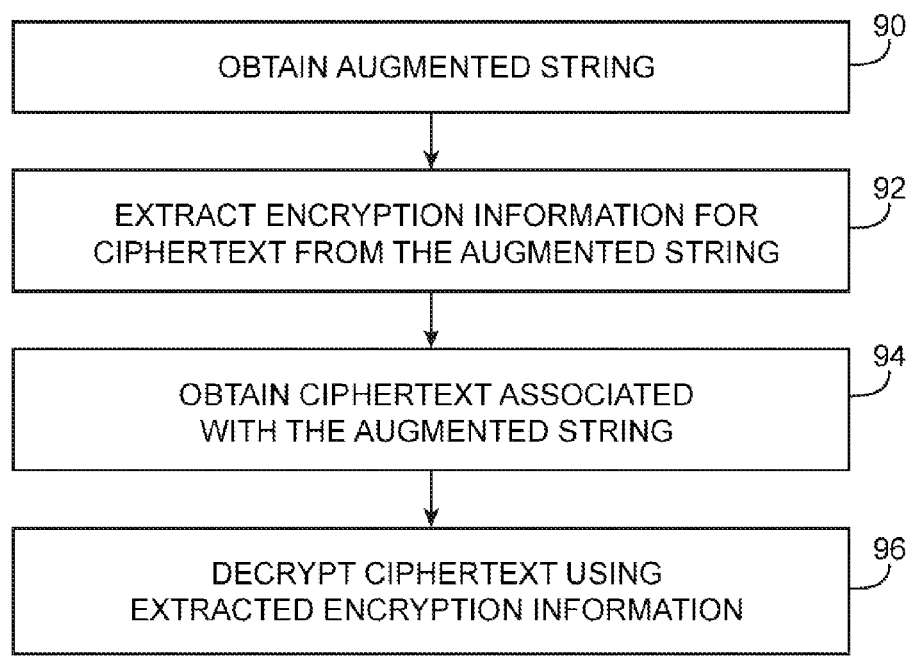
FIG. 17 is a flow chart of illustrative steps that may be used in performing decryption of a data string using encryption information embedded in an associated augmented data string in accordance with an embodiment of the present invention.

FIG. 17 is a flow chart of illustrative steps that may be used by computing equipment 12 in decrypting, decompressing, and/or extracting encryption information as in the examples of FIGS. 12-16.

In step 90, an augmented string may be obtained by computing equipment 12 from, for example, a field in a table stored on one of databases 18 (FIG. 1). The augmented string may include encrypted and non-encrypted information. The augmented string may include, as examples, a name, address or other information associated with a private number such as a Social Security Number, a payment card number, a license number or other string having a specific format. The augmented string may include encryption information such as key management data that was used in encrypting the associated private number.

In step 92, the encryption information in the augmented string may be extracted from the augmented string. If desired, additional encrypted or unencrypted information may also be extracted from the augmented string. If desired, in step 92, the encryption information may be extracted from the augmented string by decoding a portion of the augmented string in which both the encryption information and additional information were encoded as in the example of FIG. 14. If desired, in step 92, the encryption information may be extracted from the augmented string by selecting a portion of the augmented string that was added to an encrypted compressed data string as in the example of FIG. 15. If desired, in step 92, the encryption information may be extracted from the augmented string by extracting additional encryption information, decrypting encrypted information and selecting a portion of the augmented string that was added to an unencrypted compressed data string as in the example of FIG. 15.

In step 94, a ciphertext associated with the augmented string may be obtained by computing equipment 12 from, for example, an associated field in the table stored on one of databases 18 (FIG. 1).

In step 96, the ciphertext may be decrypted using the extracted encryption information from the augmented string. If desired, in step 96, if encrypted information in the augmented string was not decrypted in step 92, encrypted information in the augmented string may be decrypted and/or decompressed.

The foregoing is merely illustrative of the principles of this invention and various modifications can be made by those skilled in the art without departing from the scope and spirit of the invention.

What is claimed is:

1. A method for encrypting data entries in a data file using an encryption engine in a data processing system, comprising:
   with processing circuitry in the data processing system, encrypting a first data entry in the data file using an encryption key; and
   with the processing circuitry, embedding information associated with the encryption key that was used to encrypt the first data entry in a second data entry in the data file, wherein embedding the information associated with the encryption key comprises:
   compressing the second data entry;
   combining the information associated with the encryption key that was used to encrypt the first data entry and the compressed second data entry to form an augmented data entry that includes the information associated with the encryption key and the compressed second data entry;
   encrypting the augmented data entry using an additional encryption key; and
   combining additional information associated with the additional encryption key with the encrypted augmented data entry.

2. The method defined in claim 1 wherein the data file comprises a plurality of portions, wherein each portion includes a plurality of associated fields, and wherein the first data entry and second data entry are located in respective fields of a common one of the portions.

3. The method defined in claim 2, wherein combining the additional information associated with the additional encryption key that was used to encrypt the augmented data entry comprises encoding a portion of the encrypted augmented data entry to include the additional information associated with the additional encryption key that was used to encrypt the augmented data.

4. The method defined in claim 2 wherein encrypting the first data entry using the encryption key comprises encrypting the first data entry using the encryption key by performing a format-preserving encryption operation using the encryption key.

5. The method defined in claim 2 wherein the information associated with the encryption key includes a key version number for the encryption key.

6. The method defined in claim 5 wherein the key version number corresponds to a time.

7. The method defined in claim 5 wherein the key version number corresponds to a given encryption operation.

8. The method defined in claim 2 wherein the first data entry includes a credit card number.

9. The method defined in claim 8 wherein the second data entry comprises a customer name associated with the credit card number.

10. The method defined in claim 2 wherein the first data entry includes a Social Security Number.

11. The method defined in claim 2 wherein each of the portions comprises a row of a table and wherein the respective fields of the common one of the portions are located in a common one of the rows.

12. The method defined in claim 2 wherein each of the portions comprises a logical element in an encoded document and wherein the respective fields of the common one of the portions are sub-elements of a common one of the logical elements.

13. The method defined in claim 2 wherein each of the portions comprises a delimited object in a scripted document and wherein the respective fields of the common one of the portions are key-value pairs of a common one of the delimited objects.

14. A method for decrypting encrypted data entries in a data file using a decryption engine in a data processing system having processing circuitry, the method comprising:
with the processing circuitry, obtaining a data entry that includes information associated with an encryption key and an encrypted data entry;
with the processing circuitry, extracting the information associated with the encryption key and the encrypted data entry from the data entry, wherein the encrypted data entry has been encrypted using the encryption key;
with the processing circuitry, decrypting the extracted encrypted data entry using the extracted information associated with the encryption key to generate an augmented data entry that includes additional information associated with an additional encryption key and an unencrypted data entry;
with the processing circuitry, extracting the additional information associated with the additional encryption key and the unencrypted data entry from the augmented data entry;
with the processing circuitry, obtaining an additional encrypted data entry; and
with the processing circuitry, decrypting the additional encrypted data entry using the extracted additional information associated with the additional encryption key.

15. The method defined in claim 14 wherein the data file comprises a plurality of portions, wherein each portion includes a plurality of associated fields and wherein the data entry and the additional encrypted data entry are located in respective fields of a common one of the portions.

16. The method defined in claim 15 wherein extracting the information associated with the encryption key comprises decoding a portion of the data entry that encodes both the information associated with the encryption key and a portion of the encrypted data entry.

17. The method defined in claim 15 wherein the data entry comprises an encrypted portion and an unencrypted portion and wherein extracting the information associated with the encryption key comprises selecting the unencrypted portion of the data entry.

18. The method defined in claim 15 wherein the information associated with the encryption key comprises a key version number for the encryption key and wherein decrypting the extracted encrypted data entry using the extracted information associated with the encryption key comprises:
obtaining the encryption key using the key version number; and
decrypting the extracted encrypted data entry using the encryption key.

19. A method for securely storing a data string in a database implemented using computing equipment comprising:
encrypting the data string using a format-preserving encryption engine and an encryption key;
embedding key management data associated with the encryption key in an additional data string; and
storing the encrypted data string and the additional data string that includes the embedded key management data in associated fields of the database, wherein embedding the key management data associated with the encryption key in the additional data string comprises:
combining the key management data associated with the encryption key that was used to encrypt the data string and the additional data string to form an augmented data string that includes the key management data associated with the encryption key and the additional data string;
encrypting the augmented data string using an additional encryption key; and
combining additional key management data associated with the additional encryption key with the encrypted augmented data entry.

20. The method of claim 19, further comprising encrypting at least a portion of the additional data string.

21. The method defined in claim 19, wherein embedding the key management data associated with the encryption key in the additional data string further comprises:
compressing the additional data string; and
combining the key management data associated with the encryption key that was used to encrypt the data string and the compressed additional data string to form the augmented data string, wherein the augmented data string includes the key management data associated with the encryption key and the compressed additional data string.

22. The method defined in claim 21, wherein the data string comprises a data file having plurality of portions, wherein each portion includes a plurality of associated fields, and wherein the data string and the additional data string are located in respective fields of a common one of the portions of the data file.

23. The method defined in claim 14, further comprising:
with the processing circuitry, decompressing the unencrypted data entry that was extracted from the augmented data entry.

* * * * *